Feb. 1, 1927.
O. FABER
1,615,872
METHOD FOR RECOVERING SOLUBLE MATTER FROM AIR CURRENTS IN DRIERS
Filed Feb. 6, 1922     2 Sheets-Sheet 1
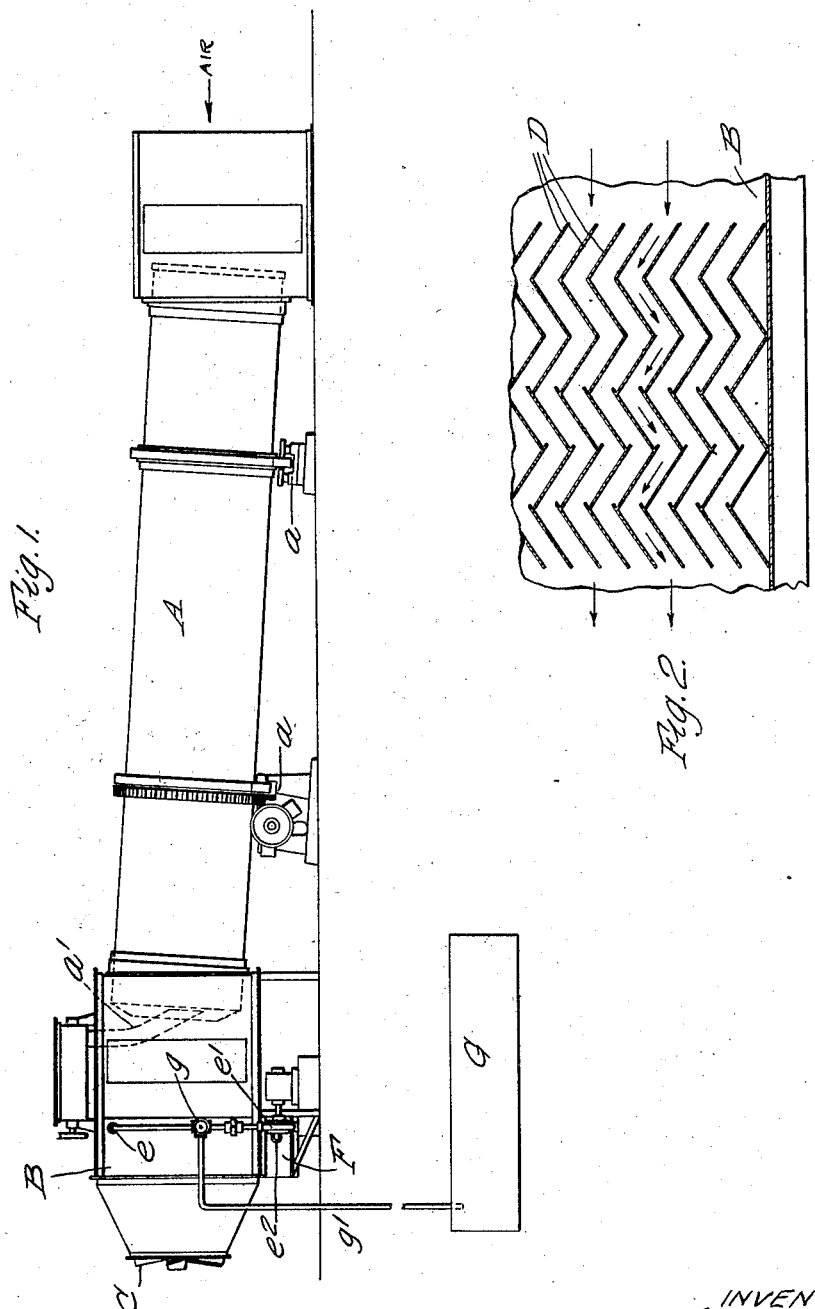
INVENTOR,
Otto Faber,
by Parker & Brochurow,
ATTORNEYS.

Patented Feb. 1, 1927.

1,615,872

UNITED STATES PATENT OFFICE.

OTTO FABER, OF BUFFALO, NEW YORK, ASSIGNOR TO THE GEO. L. SQUIER MFG. CO., OF BUFFALO, NEW YORK.

METHOD FOR RECOVERING SOLUBLE MATTER FROM AIR CURRENTS IN DRIERS.

Application filed February 6, 1922. Serial No. 534,314.

This invention relates to methods for recovering soluble matter from air currents discharged from driers, such for example as rotary drum driers.

The invention is intended primarily for use in connection with rotary drum driers of the kind which are commonly employed for drying sugar and other materials, and which include a revolving drum in which the material to be dried is acted upon by a current of heated air. This air carries with it finely divided particles of the material which is being dried and heretofore it has been customary to pass this air through a dust separator to remove the greater part of the material from the air. When the drier is used in connection with certain materials, such for example as sugar, this dust laden air is explosive.

The objects of this invention are to provide an improved method of recovering the finely divided material from the air in such a manner that the recovered material can be readily converted into the desired form; and also to improve methods of this kind in other respects hereinafter specified.

In the accompanying drawings:

Fig. 1 is a side elevation of a drum drier provided with means embodying the invention for recovering soluble matter from the air currents.

Fig. 2 is a fragmentary sectional plan view thereof on line 2—2, Fig. 3.

Figure 3:
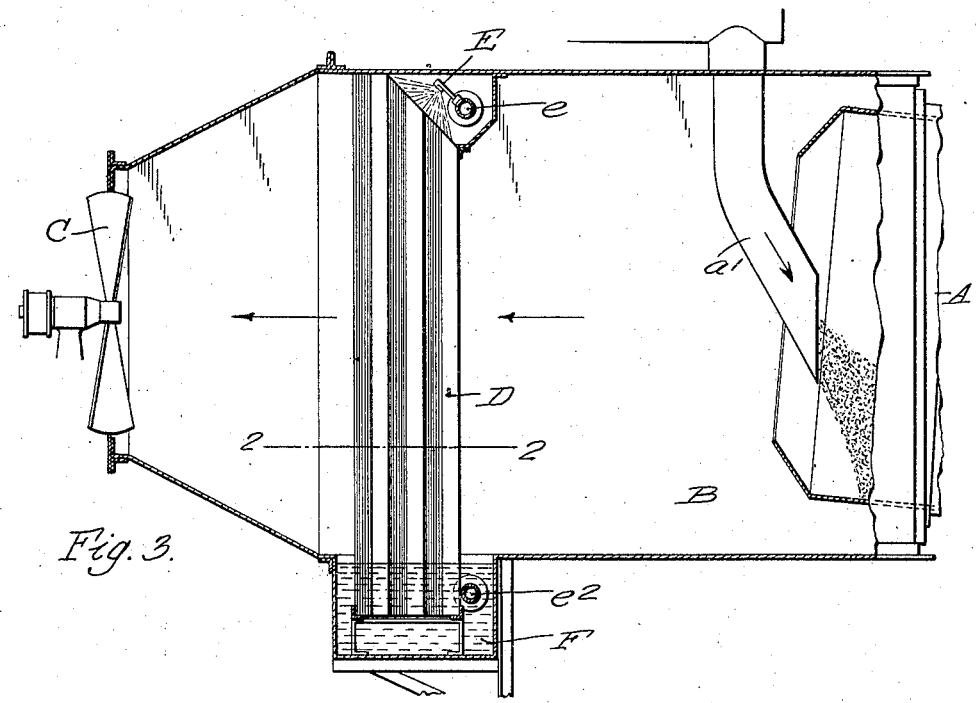
Fig. 3 is a fragmentary central sectional elevation thereof.
Figure 4:
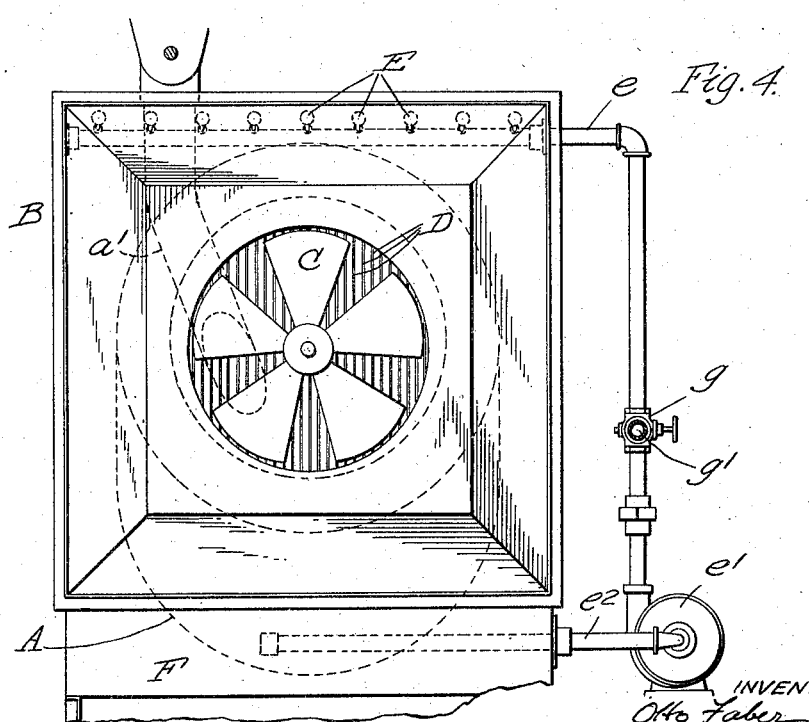
Fig. 4 is an end view thereof.

In carrying out my improved method I bring the dust-carrying air which is discharged from the drier into intimate contact with a liquid which is adapted to take from the air the particles of the material carried thereby, and this liquid may be used repeatedly so that when the method is used in connection with the drying of soluble material the liquid gradually becomes more concentrated, and after the desired concentration or density has been reached, the liquid is evaporated to recover the material dissolved therein, fresh liquid being introduced to replace the liquid which has reached the desired density. This method has the advantage that it can be carried out in immediate proximity to the air discharge end of the drier, so that the danger of explosion of the dust-carrying air is greatly reduced. Furthermore, by making a solution of the material carried by the air, this material can be readily recovered and is free from insoluble impurities.

A represents the rotary drum of a drier, which may be supported on suitable bearings $a$ and rotated by any suitable mechanism. This drum is arranged at an inclination and receives the material to be dried at the upper end thereof through a spout $a'$ or the like, and discharges the dried material at the opposite end thereof, at which end warm air is admitted which passes through the drum from the lower to the upper end thereof to remove moisture from the material which is being dried. All of these parts have heretofore been used in connection with driers and of themselves constitute no part of this invention.

The material in passing through the drum is repeatedly subjected to the air currents passing through the drum so that the moisture in the material is gradually taken up by the air. Consequently, the material before being discharged from the drum becomes very dry so that finely divided particles of the material in the form of dust, are taken up by the air and carried through the drum and out of the upper end thereof. In order to avoid loss of the material which is being dried, the particles of the material carried by the air must be removed therefrom and for this purpose the following construction is preferably employed.

The air, after passing through the drum A, enters into a housing B, the outer end of which is provided, in the construction shown, with a suction fan C which draws the air out of the housing B and consequently induces a flow of air through the drum A. The means for removing the finely divided particles from the air current are arranged in the housing B between the end of the drum and the fan C and are preferably in the form of a device for washing the air with water or other suitable fluid. Any suitable means may be provided for this purpose, such for example as a series of baffles D which are preferably so arranged as to form passages in which the direction of flow of the air is changed and against which the air impinges, and means are provided for wetting the surfaces of the baffles with water or other suitable liquid. In the construction shown, a series of flooding nozzles E is provided which are arranged to spray water on the baffles D so as to thoroughly wet the surfaces thereof. The flooding nozzles E are mounted on a supply pipe e which is preferably connected with a suitable pump e', having an inlet pipe e² which draws the liquid from a tank or reservoir F arranged beneath the baffles D. The air passing through the spaces between the baffles is brought into intimate contact with the wetted surfaces thereof in such a manner that the particles of material contained in the air are removed therefrom and deposited on the wetted surfaces of the baffles and are dissolved in the liquid. The air washing means described are preferably employed, but it is not intended to limit the invention to be used in connection with the particular air washing appliances shown since any other means for removing the particles of material from the air by means of liquid may be employed.

The circulating of the air washing liquid in the manner shown in the drawings so that the liquid may be used as many times as desired, has the advantage that the liquid may in this manner attain the desired density. After the circulating liquid has reached the desired density it may be removed from the reservoir F in any suitable manner and may be evaporated to recover the soluble matter. In Fig. 1 an evaporating pan or analogous device G is shown diagrammatically, a two-way valve g being arranged in the supply pipe e which is adapted to connect the pump with the supply pipe for directing the liquid to the baffles or with a pipe g' for discharging the liquid to the evaporating pan.

The method described has the advantage of very efficiently removing the solid matter from the air, and the air washing apparatus occupies very little space and can be placed directly into the housing B in close proximity to the air discharge end of the drum drier. The air discharged from the air washer is so free from dust and also sufficiently cooled by contact with the liquid that it can be discharged directly into the room in which the drier is located, thereby eliminating the necessity for air passages to conduct this air out of the building. In case the apparatus is used in connection with the drying of sugar and certain other materials, which when suspended in finely divided form in the air form an explosive mixture, the danger of explosion is very greatly reduced in the first place, on account of the comparatively small volume of dust-laden air, due to the fact that the air washer is in close proximity to the air discharge drum of the drying drum, and in the second place, because the suction fan operates on the air after the same has passed through the washing means so that any sparks which might be produced by the fan cannot cause an explosion.

While in many cases it is desirable to subject the liquid repeatedly to the air passing out of the drier, yet it is not intended to limit the invention to such use, since in many installations, for example in sugar mills where much water is used during the process of making sugar, the water may be passed through the air washer only once, and then used in some part of the process of manufacture, where the soluble material in the water will be recovered.

I claim as my invention:

1. The hereindescribed method of recovering soluble solids in finely comminuted form from air currents discharged from driers, consisting of passing the air, immediately upon leaving a drier, into intimate contact successively with different portions of liquid to cause the liquid to take particles of said solids from the air and form solutions therewith, and using said solutions in the manufacture of said soluble solids.

2. The hereindescribed method of recovering soluble solids from air currents discharged from driers, consisting of passing the air, immediately upon leaving a drier, into contact with liquid to cause the liquid to take particles of said solids from the air, and using the liquid containing the dissolved solid matter in the manufacture of said soluble solids.

3. In the process of manufacturing sugar, the herein described method of recovering sugar from air currents discharged from a sugar drier used for drying wet sugar of crystalline form, consisting of passing the air immediately upon leaving the drier into contact with a plurality of films of water to cause the water to take the particles of sugar from the air and to dissolve the same and utilizing the water with the sugar dissolved therein in the process of making sugar.

OTTO FABER.